United States Patent [19]
Kuchar

[11] Patent Number: 6,125,702
[45] Date of Patent: Oct. 3, 2000

[54] RETURN GRAIN ELEVATOR MONITOR

[76] Inventor: George J. Kuchar, P.O. Box 696, Carlinville, Ill. 62626

[21] Appl. No.: 09/022,694
[22] Filed: Feb. 12, 1998
[51] Int. Cl.⁷ ..................................................... A01D 75/00
[52] U.S. Cl. .......................... 73/579; 73/584; 56/10.2 R; 56/DIG. 15
[58] Field of Search .............................. 73/579, 584, 659, 73/861, 865.5, 572, 587; 460/1, 4, 5, 11, 12, 13, 96; 56/DIG. 15, 10.2 R, 10.2 C

[56] References Cited

U.S. PATENT DOCUMENTS

| | | | |
|---|---|---|---|
| 3,574,307 | 4/1971 | Theobald | 130/24 |
| 4,000,398 | 12/1976 | Conner | 235/92 |
| 4,036,065 | 7/1977 | Strelioff et al. | 73/552 |
| 4,292,981 | 10/1981 | De Busscher et al. | 56/14.6 |
| 4,322,937 | 4/1982 | Hollmann | 56/10.2 |
| 4,360,998 | 11/1982 | Somes | 56/10.2 |
| 4,441,513 | 4/1984 | Herwig | 56/10.2 |
| 4,720,962 | 1/1988 | Klinner | 56/10.2 |
| 4,897,072 | 1/1990 | Bestland | 460/99 |
| 5,046,362 | 9/1991 | Strubbe | 73/579 |
| 5,070,682 | 12/1991 | Bohman | 56/10.2 |
| 5,800,262 | 9/1998 | Andersen et al. | 56/10.2 R |

Primary Examiner—Helen C. Kwok
Attorney, Agent, or Firm—Richard C. Conover

[57] ABSTRACT

A combine return grain monitor for monitoring grain flow in a return grain path and for directing an electrical signal to a meter located in the cab of the combine to provide the operator with continuous visual indication of the grain being transported in the return grain path. A wedge-shaped horn is positioned on a wall of the combine just below the opening through which the return material is dropped to the return grain cross auger. Much of the tailings material falls against the outer surface of the wedge-horn before falling on through the opening onto the return grain cross auger. The wedge-horn mechanically amplifies sound as material strikes its outer surface. A microphone, located inside the wedge-horn, picks up the amplified sound of material striking the outer surface of the wedge-horn. The microphone provides an electrical signal which is directed to a meter located in the cab of the combine.

3 Claims, 2 Drawing Sheets

RETURN GRAIN ELEVATOR MONITOR

BACKGROUND

This invention relates to a monitor apparatus located in the return grain elevator of a combine for monitoring the amount of grain being returned to the sorting sieves.

In grain combines, the grain and other material that does not pass through the sieves in the normal manner is called "tailings". These tailings are shunted out of the normal path and moved upward through a return grain elevator. At the upper end of the return grain elevator, chaff and grain fall out through an opening, pass through a chute, and then enter a return grain cross auger. Grain in this path eventually reenters the sieves to be sorted once again to recover grain that was not sorted out by the sieve, during the first pass over the sieves.

Heavy grain flow in the return grain cross auger path indicates to an operator that the combine sieves are closed too much. Light grain flow indicates that the sieves are open too far. With most combines, the only way an operator can check for excessive light grain flow in this path is to get out of the combine cab and go back and visually inspect the grain flow in either the return grain elevator or in the return grain cross auger.

Several patents have described electronic sensors placed on combines to help in the monitoring of grain flows. For example, see U.S. Pat. No. 4,036,065 to Strelioff et al. which describes the use of a microphone located at the rear of the sieves to determine by a sampling process the amount of grain lost over the back of the sieves and over the straw walker assembly. The microphone detects the sound of grain striking spaced apart fingers located adjacent to the rear end of the sieve.

U.S. Pat. No. 5,312,299 to Behnke et al. describes a grain flow measuring device utilizing a piezoelectric oscillator to gather a statistical sampling of grain from the trailing end of a rocker tray to measure the grain loss during the combining process. The piezoelectric oscillator is located behind a sensor plate against which grain strikes. The pressure of the grain striking the plate is detected by the piezoelectric oscillator.

Another piezoelectric grain flow monitor is shown in U.S. Pat. No. 3,606,745 to Girodat.

U.S. Pat. No. 4,441,513 to Herwig describes a photoelectric beam apparatus for sensing the total volume of trailings including both grain and chaff being returned by a grain return elevator.

It is an object of the present invention to provide a return grain elevator monitor located in the return grain path to detect the amount of grain that is being returned by the return grain elevator so that the sieves in the normal grain flow path can be adjusted accordingly.

SUMMARY OF INVENTION

This invention provides for a combine return grain monitor for monitoring grain flow in a return grain path and for directing an electrical signal to a meter located in the cab of the combine to provide the operator with continuous visual indication of the grain being transported in the return grain path. A wedge-shaped horn is positioned on a wall of the combine just below the opening through which the return material is dropped to the return grain cross auger. Much of the tailings material falls against the outer surface of the wedge-horn before falling on through the opening onto the return grain cross auger. The wedge-horn mechanically amplifies sound as material strikes its outer surface. A microphone, located inside the wedge-horn, picks up the amplified sound of material striking the outer surface of the wedge-horn. The microphone provides an electrical signal which is directed to a meter located in the cab of the combine.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
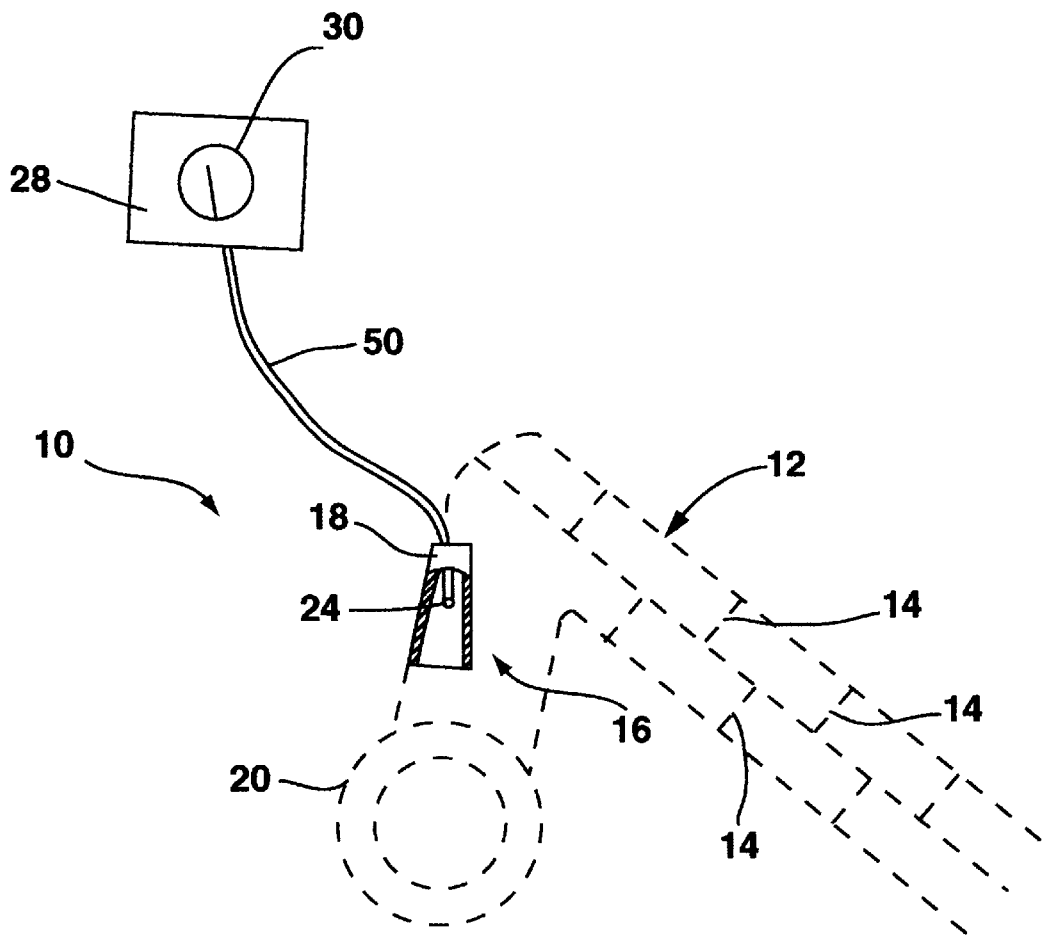
FIG. 1 is a mechanical schematic of a combine return grain monitor according to the present invention.

A combine return grain monitor 10 for visually monitoring grain flow in the return grain path is schematically shown in FIG. 1. The tailings of grain and chaff leaving the sieves of a combine are lifted in a conventional manner by return grain elevator 12 having paddles 14. As this material reaches the top of elevator 12, it passes through an opening leading to chute 16. A wedge-horn 18 is mounted to wall of the combine in chute 16 as shown in FIG. 1. The tailings dropping into chute 16 fall against the outer surface of the wedge-horn 18. In a preferred embodiment, wedge-horn 18 is constructed of sheet metal which makes an audible sound as these tailings strike its outer surface.

Figure 2:
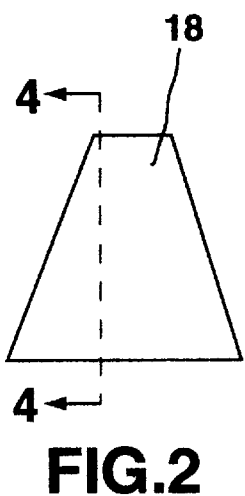
FIG. 2 is an enlarged elevational view of a wedge-horn shown as element 18 in FIG. 1.
Figure 3:
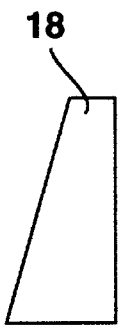
FIG. 3 is a right side view of the wedge-horn shown in FIG. 2.
Figure 4:
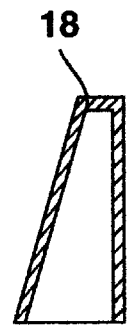
FIG. 4 is a cross-sectional view taken along the line 4—4 in FIG. 2.

As best seen in FIG. 1, a microphone 24 is positioned inside wedge-horn 18 and picks up the audible sound of the material striking the outer surface of the wedge-horn. The wedge-horn 18 protects the microphone from grain and chaff and is shaped, as shown in FIGS. 2–4, to mechanically amplify the sound before the sound reaches microphone 24 located in the interior of the wedge-horn. The sound reaching microphone 24 varies in intensity depending upon the composition of the tailings being transported in the return grain path. Chaff will fall softly on the outer surface of wedge-horn 18 making a very soft sound. Light grain flow will have a muted sound slightly louder than chaff. Heavy grain flow will have a very loud sound.

A cable 50 leads the electrical output signal from microphone 24 to an electrical circuit contained in box 28 located in the cab of a combine and also leads power from a power source located in box 28 to microphone 24. Box 28 holds a meter 30 for receiving the output signal from microphone 24 and displaying an indication of the grain flow in the grain return path.

Figure 5:
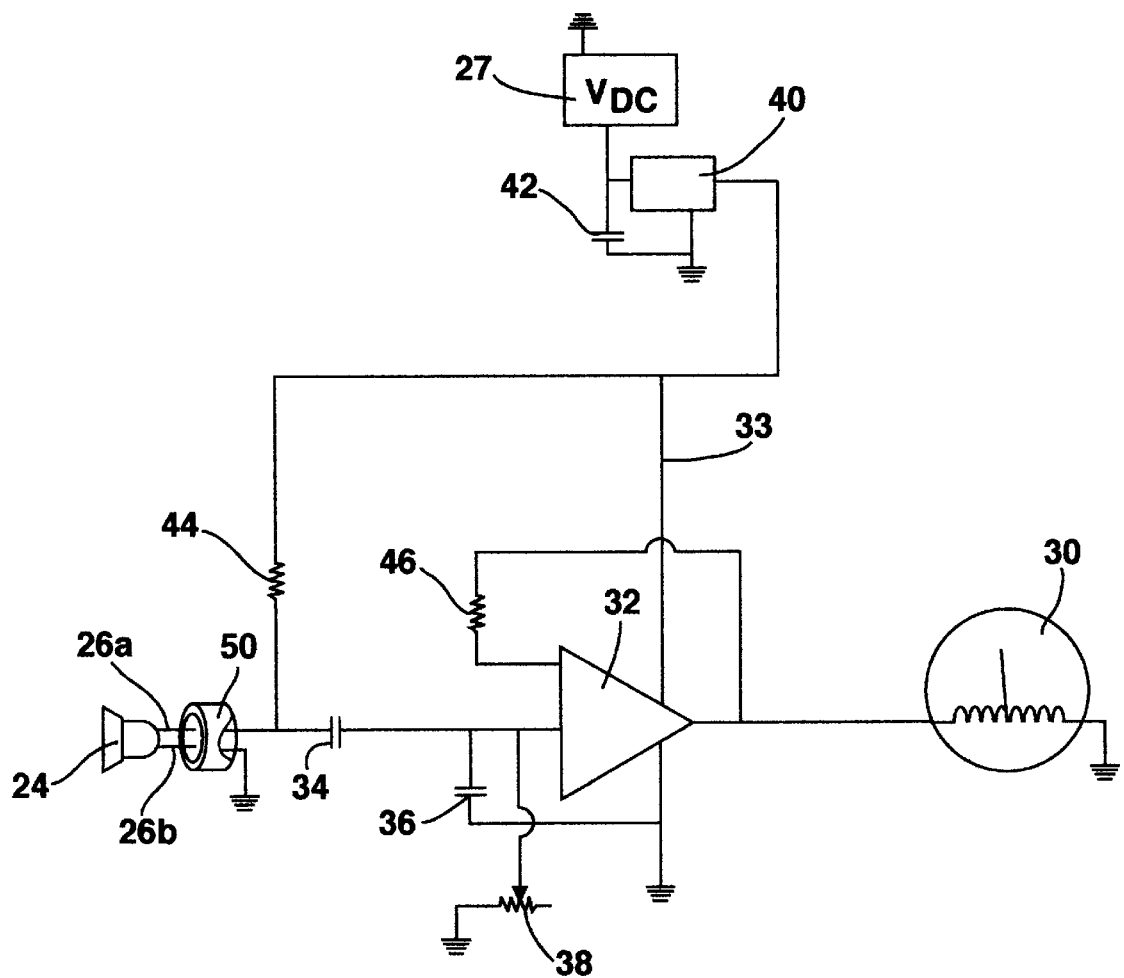
FIG. 5 is an electrical schematic of a circuit used with the combine return grain monitor shown in FIG. 1.

FIG. 5 schematically shows the electrical circuit contained in box 28 to couple the signal output of microphone 24 to meter 30. The microphone 24 provides an alternating current (AC) signal as an input to an operational amplifier 32. A blocking capacitor 34 in this line blocks the direct current (DC) going to the microphone from entering as an input to amplifier 32. A high frequency bleed capacitor 36 in this line will bleed high frequency transients to ground instead of letting them pass as an input to amplifier 32. A variable resistor 38, also in the microphone 24 input line, permits adjusting the input to amplifier 32 so that meter 30 can be "zeroed" when there is no grain flowing in the return path.

DC power from a power supply battery 27 is directed to voltage regulator 40. A capacitor 42 grounds transients on the input side of voltage regulator 40. From voltage regulator 40, regulated DC power is then led to amplifier 32 through lead 33 to power the amplifier circuit and is also led to microphone 24 through resistor 44 and lead 26a located in cable 50. The resistor 44 is used to reduce the voltage of the power supply 27 to the level required by the microphone 24. A lead 26a is located in cable 50 provides a ground for microphone 24.

A feedback circuit is used to stabilize amplifier 32. This feedback circuit is constructed by leading a signal output from the amplifier 32 back through resister 46 and to an input of amplifier 32.

The output of amplifier 32 is also led to meter 30. Meter 30 may be color coded with different colors to show relative grain flows in the grain return path: for instance green may indicate flow is normal, yellow may indicate a cautionary increase in grain flow, and red may indicate a rather high grain flow. Of course meter 30 could be marked in other units equally as well to indicate the various rates of grain flowing in the return path.

With the present invention, grain flow in the return path may be continuously monitored by the operator in the cab. The invention gives a visual indication at all times of whether the sieves need to be adjusted to increase or decrease grain flow.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A return grain elevator monitor for monitoring grain flow in a return grain path of a combine comprising:

a metallic wedge-horn located in the return grain path for producing and amplifying an audible signal when grain strikes the exterior surface of the metallic wedge-horn;

the wedge-horn having a hollow interior;

a microphone positioned in the interior of the wedge-horn for detecting the intensity of the audible signal and providing an electrical signal output corresponding to the intensity; and a meter electrically connected to the microphone for providing a visual reading of the intensity corresponding to the electrical signal output of the microphone.

2. The return grain elevator monitor of claim 1 wherein the meter is located in the cab of the combine.

3. The return grain elevator monitor of claim 1 wherein the wedge-horn is located in a chute fluidly connecting a return grain elevator of the combine with a return grain cross auger of the combine.

* * * * *